(12) United States Patent
Savard

(10) Patent No.: US 8,701,233 B2
(45) Date of Patent: Apr. 22, 2014

(54) MECHANISM FOR ADJUSTING THE CIRCUMFERENCE OF SCRAPER CUPS OR DISCS

(76) Inventors: Donald Savard, Edmonton (CA); Donna Savard, legal representative, Edmonton (CA)

( * ) Notice: Subject to any disclaimer, the term of this patent is extended or adjusted under 35 U.S.C. 154(b) by 330 days.

(21) Appl. No.: 12/776,658

(22) Filed: May 10, 2010

(65) Prior Publication Data

US 2010/0289224 A1 Nov. 18, 2010

(30) Foreign Application Priority Data

May 13, 2009 (CA) .................................... 2670048

(51) Int. Cl.
*B08B 9/04* (2006.01)
(52) U.S. Cl.
USPC ......................... 15/3.5; 15/104.16; 15/104.17
(58) Field of Classification Search
USPC ........ 15/3.5, 104.06, 104.16, 104.17, 104.18, 15/104.19
See application file for complete search history.

(56) References Cited

U.S. PATENT DOCUMENTS

| | | | |
|---|---|---|---|
| 1,872,855 A * | 8/1932 | Walker | 166/70 |
| 2,402,796 A * | 6/1946 | Wood | 15/104.061 |
| 3,940,855 A | 3/1976 | Ver Nooy et al. | |
| 3,973,441 A | 8/1976 | Porter | |
| 4,275,475 A * | 6/1981 | Schwartz et al. | 15/104.061 |
| 4,462,430 A * | 7/1984 | Anthony et al. | 138/89 |
| 4,495,808 A | 1/1985 | Fischer, III | |
| 4,706,748 A | 11/1987 | Harris | |
| 4,726,089 A * | 2/1988 | Knapp | 15/104.061 |
| 4,875,615 A * | 10/1989 | Savard | 228/119 |
| 5,797,993 A * | 8/1998 | Woehleke | 134/8 |
| 6,041,811 A * | 3/2000 | Walter et al. | 137/334 |
| 6,067,682 A | 5/2000 | Rankin | |
| 6,098,664 A * | 8/2000 | Savard et al. | 138/89 |
| 6,679,129 B2 * | 1/2004 | Savard | 73/865.8 |
| 6,857,329 B2 * | 2/2005 | Savard | 73/865.8 |
| 7,000,280 B1 | 2/2006 | Knapp | |
| 2003/0041400 A1 | 3/2003 | Knapp | |
| 2003/0056309 A1 | 3/2003 | Savard | |

* cited by examiner

*Primary Examiner* — Monica Carter
*Assistant Examiner* — Michael Jennings
(74) *Attorney, Agent, or Firm* — Davis & Bujold, PLLC; Michael J. Bujold

(57) ABSTRACT

A sealing element for a pipeline pig includes rigid first and second cup supports having outer peripheral edges. A resilient sealing element protrudes beyond the outer peripheral edge of each of the first cup support and the second cup support. Means are provided for clamping the sealing element between the first cup support and the second cup support.

16 Claims, 2 Drawing Sheets

MECHANISM FOR ADJUSTING THE CIRCUMFERENCE OF SCRAPER CUPS OR DISCS

BACKGROUND

A mechanism for adjusting the outer circumference of scraper cups or scraper discs used in pipelines. The mechanism is intended to extend the useful life of the elastomeric cup or disc which will reduce operating and disposal costs.

SUMMARY

There is provided a sealing element for a pipeline pig, comprising a rigid first cup support having an outer peripheral edge, a rigid second cup support having an outer peripheral edge, a resilient sealing element that protrudes beyond the outer peripheral edge of each of the first cup support and the second cup support, and means for clamping the sealing element between the first cup support and the second cup support.

There is provided a method of prolonging the usable life of a sealing element for a pipeline pig, comprising the steps of: providing a support structure that supports a resilient sealing cup secured to a pipeline pig in an angular orientation that will maintain an effective seal of the sealing cup during operation of the pipeline pig; and altering the support structure as the sealing cup wears to reposition the sealing cup to an alternative angular orientation that will maintain an effective seal of the worn sealing cup during continued operation of the pipeline pig.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DESCRIPTION

An elastomeric disc or cup (Resilient Member RM) for use on a pipeline pig of the type has a longitudinal body supported centrally within a pipeline to be propelled through the pipeline by material in the pipeline such a oil, gas water etc. The RM in form of a elastomeric material having an outer peripheral circumference somewhat larger than the inner diameter of the pipe and an inner portion that is suited to be attached to a mounting assembly that can be attached to a pig body. Typical RMs used by the industry are set at one size and once the portion that contacts the inner wall of the pipe is worn, the fit becomes loose and fluid will be allowed to bypass the RM. If the assembly is used for isolation of different types of material in the pipeline, fluid will bypass and contaminate adjacent material. If the pipeline pig is used for cleaning by scraping contaminates from the inner wall pipe, the RM start to wear and the cleaning efficiency will slowly reduce until there is no scraping action at all.

The improved assembly will allow a user to adjust the outer circumference of the RM so that as it wears, adjustment can be made so that the useful life of the RM can be extended. The mechanism will allow this to occur as many times as practical. The application details a configuration that would allow the adjustment to be made three times. The operator can choose the number of change increments that would be used. This will result in reduced operating costs associated with reducing the new RMs purchased as well as disposal costs of used Rms.

Figure 1:
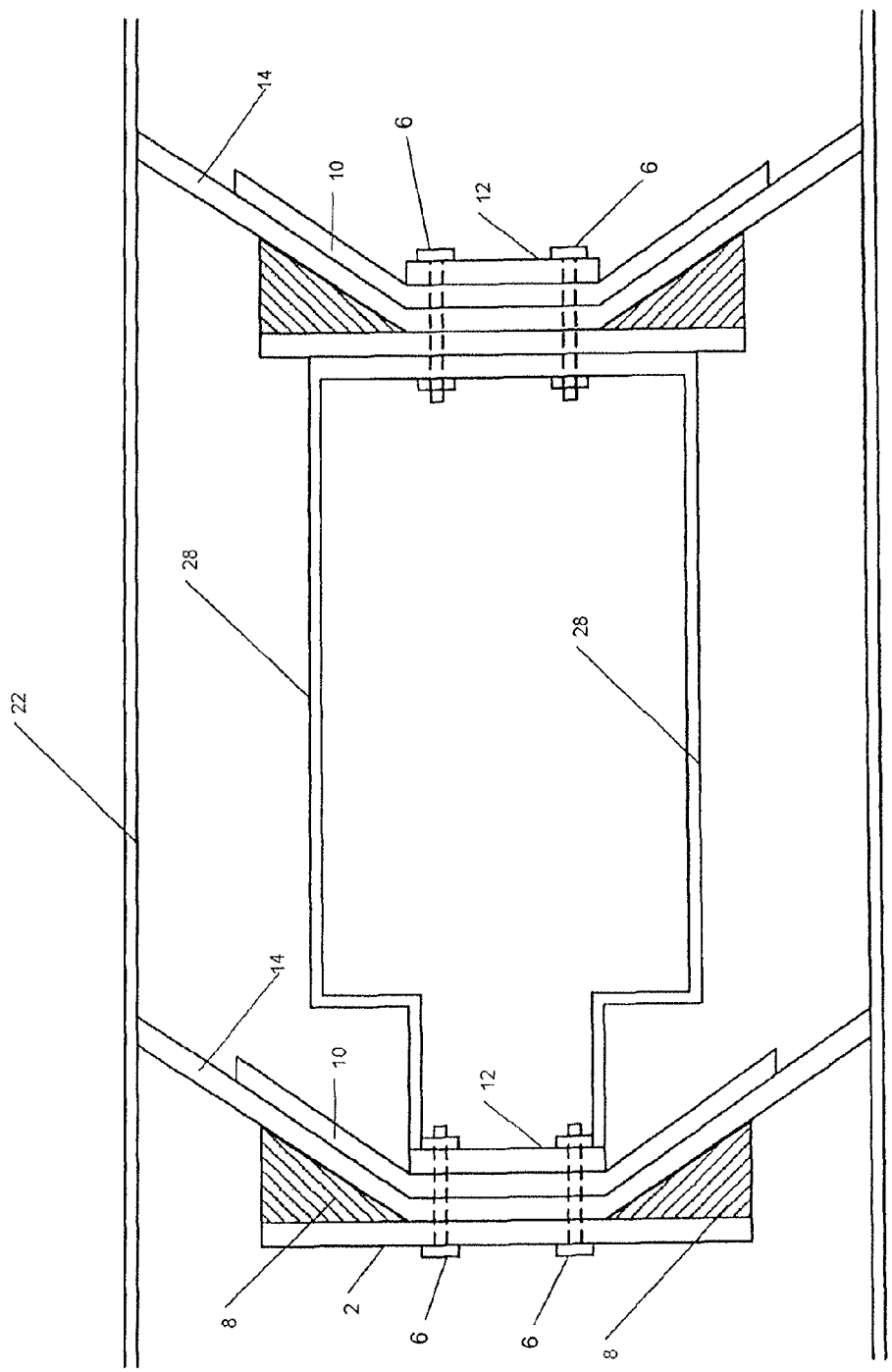
FIG. 1 is a side elevation view of the sealing element incorporated onto a pipeline pig.

Referring to FIG. 1, the adjustment assembly is shown attached to body 28, which will allow the complete assembly to travel through a pipe 22.

Figure 4:
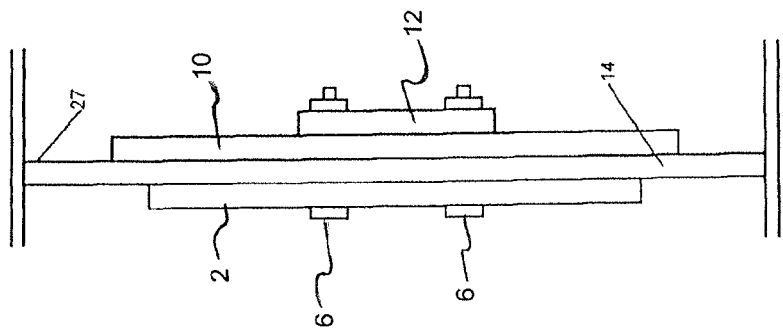
FIG. 4 is a side elevation view in section of the sealing element in a third position.
Figure 3:
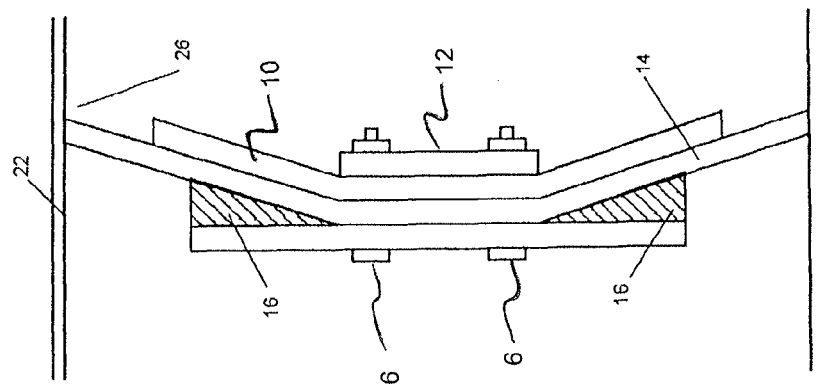
FIG. 3 is a side elevation view in section of the sealing element in a second position.
Figure 2:
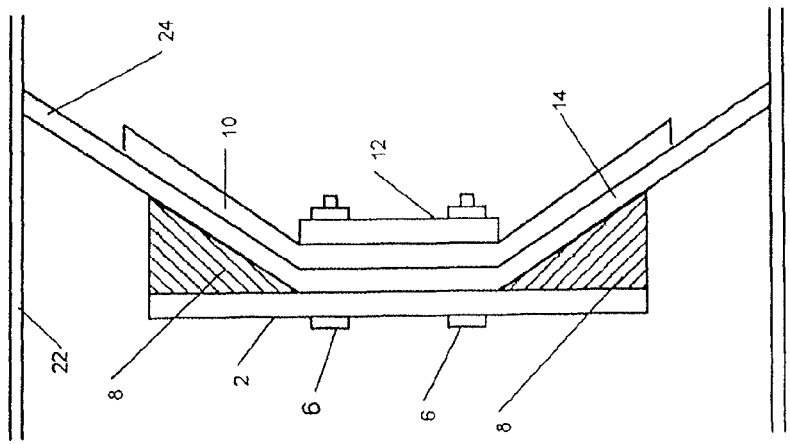
FIG. 2 is a side elevation view in section of the sealing element in a first position.

The RM 14 (SCRAPER CUP) as shown in FIGS. 2,3 and 4 detail shows the adjustment assembly with three step adjustment in pipe 22. FIG. 2 has a backing plate 2 with adjustment segments or deflectors (deflection angle setter) 8 that will flex the RM 14 to a set deflection angle. Deflector 8 is sized so that the RM engages the pipe wall 22 and can be changed to compensate for wear on the RM. Backing disc 10 allows the thickness of RM 14 to be made thinner than normal, reducing manufacturing cost. The backing disc 10 will add additional pressure where the RM 14 contacts the pipe wall. The compression plate 12 is used to flex the RM 14 and backing disc 10 to a set position. This is accomplished by torquing bolts 6 which will cause deflector 8 to force the RM 14 and disc 10 to flex to the desired position.

Once the RM 14 is worn and it no longer has sufficient contact with the pipe wall 22 at point 24 the mechanism is reconfigured as shown in FIG. 3. The smaller deflector 16 is exchanged with deflector 8 which flexes the RM 14 less which will cause the RM 14 to contact the pipe wall 22 with renewed pressure at point 26.

Once the RM 14 is worn so that it no longer has sufficient contact with pipe wall 22 the mechanism is reconfigured as shown in FIG. 4. Deflector 16 is removed which will cause RM 14 to contact the pipe wall 22 with renewed pressure at point 27.

Accordingly, the complete assembly shown in FIG. 1 may be used for the following purposes:

Use of deflector to adjust the RMs circumference a number of times to compensate for normal wear.

Use of a backing disc of different thicknesses allowing the operator to adjust Rms contact pressure on pipe wall.

Use of a backing disc to allow thinner RMs to be used so that operating cost can be significantly reduced.

The first cup support may comprise only the backing plate 2 (see FIG. 4) or the backing plate 2 and the deflector 16 (see FIG. 3) or the backing plate 2 and the deflector 8 (see FIGS. 1 and 2) while the second cup support generally comprises the backing disc 10 oriented at different angles with respect to the body 28 (see FIGS. 1-4).

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:
1. A pipeline pig comprising:
a pipeline pig body;
a resilient sealing element;
a mounting assembly comprising:
   a rigid first cup support mounted to the pipeline pig body, and the first cup support having an outer peripheral edge;
   a rigid second cup support mounted to the pipeline pig body, and the second cup support having an outer peripheral edge; and
   a deflection angle setter which facilitates setting of the resilient sealing element at a desired one of a plurality of deflection angles, wherein the deflection angle setter includes a plurality of replaceable deflectors which are each positioned between the resilient sealing element and the rigid first cup support to facilitate orientating the resilient sealing element in a plurality of different scraping orientations relative to the pipeline pig body;
the resilient sealing element being positioned between the rigid first cup support and the second rigid cup support and protruding beyond the outer peripheral edge of each of the first cup support and the second cup support; and
the rigid first and second cup supports and the deflection angle setter selectively supporting the resilient sealing element in more than one sealing orientation, relative to the pipeline pig body, and facilitate adjustably changing the sealing orientation of the resilient sealing element relative to the pipeline pig body.

2. The pipeline pig of claim 1, wherein one of the first cup support and the second cup support has a concave seal support surface and another of the first cup support and the second cup support has a convex seal support surface.

3. The pipeline pig of claim 1, wherein the rigid first cup support has a first seal support and the rigid second cup support has a second seal support, and the first and the second seal support surfaces are planar.

4. The pipeline pig of claim 1, wherein the mounting assembly comprises a plurality of replaceable mating sets of first and second cup supports that sandwich and support the resilient sealing element in different sealing orientations, and the sealing position of the resilient sealing element being adjusted by replacing the first and the second cup supports.

5. The pipeline pig of claim 4 wherein the plurality of replaceable mating sets comprise at least a set of first and second cup supports having concave and convex support surfaces that support the resilient sealing element at an angle relative to an axis of the pipeline pig body and at least a second set of first and second cup supports having planar seal support surfaces that support the resilient sealing element perpendicular to the axis of the pipeline pig body.

6. The pipeline pig of claim 4, wherein at least a first one of the plurality of replaceable first cup supports comprises a first deflector.

7. The pipeline pig of claim 4, wherein at least a first one of the plurality of replaceable first cup supports comprises a first deflector;
   at least a second one of the plurality of replaceable first cup supports comprises a second deflector; and
   the first deflector orients the resilient sealing element in a different orientation than the second deflector.

8. The pipeline pig of claim 1, wherein each sealing orientation comprises a different orientation relative to the pipeline pig body.

9. The sealing element of claim 1, wherein the deflection angle setter comprises a first replaceable deflector which is positionable between the resilient sealing element and the rigid first cup support to facilitate orientating the resilient sealing element in a first scraping orientation relative to the pipeline pig body.

10. The sealing element of claim 1, wherein the deflection angle setter comprises a first replaceable deflector which is positionable between the resilient sealing element and the rigid first cup support to facilitate orientating the resilient sealing element in a first scraping orientation relative to the pipeline pig body; and
   a second replaceable deflector which is positionable between the resilient sealing element and the rigid first cup support to facilitate orientating the resilient sealing element in a different second scraping orientation relative to the pipeline pig body.

11. A pipeline pig, comprising:
a pipeline pig body;
a leading end front rigid first cup support mounted to the pipeline pig body, and the first cup support having an outer peripheral edge and forming a leading end first seal support surface;
a leading end rigid second cup support mounted to the pipeline pig body, and the second cup support having an outer peripheral edge and forming a leading end second seal support surface;
a leading end resilient sealing element positioned between the leading end first seal support surface and the leading end second seal support surface and protruding beyond the outer peripheral edge of each of the leading end first cup support and the leading end second cup support;
the leading end rigid first cup support, the leading end rigid second cup support and a deflection angle setter, which facilitates setting of the resilient sealing element at a desired one of a plurality of deflection angles, form a mounting assembly, wherein the deflection angle setter includes a plurality of replaceable deflectors which are each positioned between the resilient sealing element and the rigid first cup support to facilitate orientating the resilient sealing element in a plurality of different scraping orientations relative to the pipeline pig body; and
the mounting assembly selectively sandwiching the leading end resilient sealing element therebetween in more than one sealing position relative to the pipeline pig body, and a position of at least one of the leading end first and second seal support surfaces being adjustable, by at least the deflection angle setter to change the sealing position of the leading end resilient sealing element;
a leading end clamp for clamping the sealing element between the leading end first cup support and the leading end second cup support.

12. The pipeline pig of claim 11, wherein the deflection angle setter comprises one leading end insertable deflector comprises a plurality of replaceable leading end deflectors that facilitate supporting the leading end resilient sealing element in different sealing positions, and the sealing position of the leading end resilient sealing element being adjusted by selecting a desired one of the plurality of replaceable leading end deflectors.

13. The pipeline pig of claim 12, wherein the at least one leading end insertable deflector comprises at least a first leading end deflector having a support surface that facilitates supporting the leading end resilient sealing element at an angle relative to an axis of the pipeline pig body,
- at least a second leading end deflector which facilitates supporting the leading end resilient sealing element at a different angle with respect to the axis of the pipeline pig body, and
- when the leading end resilient sealing element is directly sandwiched between the first and second seal support surfaces, the leading end resilient sealing element extends perpendicular to the axis of the pipeline pig body.

14. The pipeline pig of claim 13, wherein the at least one leading end insertable deflector comprises a plurality of replaceable leading end deflectors that facilitate supporting the leading end resilient sealing element in different sealing positions, and the sealing position of the leading end resilient sealing element being adjusted by selecting a desired one of the plurality of replaceable leading end deflectors; and
- the at least one trailing end insertable deflector comprises a plurality of replaceable trailing end deflectors that facilitate supporting the trailing end resilient sealing element in different sealing positions, and the sealing position of the trailing end resilient sealing element being adjusted by selecting a desired one of the plurality of replaceable trailing end deflectors.

15. The pipeline pig of claim 14, wherein the at least one leading end insertable deflector comprises at least a first leading end deflector having a support surface that facilitates supporting the leading end resilient sealing element at an angle relative to an axis of the pipeline pig body;
- at least a second leading end deflector which facilitates supporting the leading end resilient sealing element at a different angle with respect to the axis of the pipeline pig body;
- when the leading end resilient sealing element is directly sandwiched between the first and second seal support surfaces, the leading end resilient sealing element extends perpendicular to the axis of the pipeline pig body;
- the at least one trailing end insertable deflector comprises at least a first trailing end deflector having a support surface that facilitates supporting the trailing end resilient sealing element at an angle relative to an axis of the pipeline pig body;
- at least a second trailing end deflector which facilitates supporting the trailing end resilient sealing element at a different angle with respect to the axis of the pipeline pig body; and
- when the trailing end resilient sealing element is directly sandwiched between the first and second seal support surfaces, the trailing end resilient sealing element extends perpendicular to the axis of the pipeline pig body.

16. A pipeline pig, comprising:
a pipeline pig body;
a leading end front rigid first cup support mounted to the pipeline pig body, and the first cup support having an outer peripheral edge and forming a leading end first seal support surface;
a leading end rigid second cup support mounted to the pipeline pig body, and the second cup support having an outer peripheral edge and forming a leading end second seal support surface;
a leading end resilient sealing element positioned between the leading end first seal support surface and the leading end second seal support surface and protruding beyond the outer peripheral edge of each of the leading end first cup support and the leading end second cup support;
the leading end rigid first cup support, the leading end rigid second cup support and a leading end deflection angle setter, which facilitates setting of the resilient sealing element at a desired one of a plurality of deflection angles, form a leading end mounting assembly, wherein the deflection angle setter includes a plurality of replaceable deflectors which are each positioned between the resilient sealing element and the rigid first cup support to facilitate orientating the resilient sealing element in a plurality of different scraping orientations relative to the pipeline pig body;
the leading end mounting assembly selectively sandwiching the leading end resilient sealing element therebetween in more than one sealing position relative to the pipeline pig body, and a position of at least one of the leading end first and second seal support surfaces being adjustable, by the leading end deflection angle setter to change the sealing position of the leading end resilient sealing element;
a trailing end front rigid first cup support mounted to the pipeline pig body, and the first cup support having an outer peripheral edge and forming a trailing end first seal support surface;
a trailing end rigid second cup support mounted to the pipeline pig body, and the second cup support having an outer peripheral edge and forming a trailing end second seal support surface;
a trailing end resilient sealing element positioned between the trailing end first seal support surface and the trailing end second seal support surface and protruding beyond the outer peripheral edge of each of the trailing end first cup support and the trailing end second cup support;
trailing end rigid first cup support, the trailing end rigid second cup support and a trailing end deflection angle setter, which facilitates setting of the resilient sealing element at a desired one of a plurality of deflection angles, form a trailing end mounting assembly; and
the trailing end mounting assembly selectively sandwiching the trailing end resilient sealing element therebetween in more than one sealing position relative to the pipeline pig body, and a position of at least one of the trailing end first and second seal support surfaces being adjustable, by the trailing end deflection angle setter to change the sealing position of the trailing end resilient sealing element.

* * * * *